United States Patent Office 3,045,045
Patented July 17, 1962

3,045,045
PREPARATION OF NAPHTHALENE CARBOXYLIC ACID ANHYDRIDES
John J. Melchiore, Wallingford, Pa., assignor to Sun Oil Company, Philadelphia, Pa., a corporation of New Jersey
No Drawing. Filed Dec. 2, 1959, Ser. No. 856,676
9 Claims. (Cl. 260—546)

Aromatic acid anhydrides have been prepared in the prior art by reaction of aromatic acid with acetic anhydride in the presence of phosphoric acid, at about 140° C. The aromatic acids from which the anhydrides have been prepared can themselves be obtained by liquid phase partial oxidation of alkyl aromatic hydrocarbons. The preparation of an aromatic acid anhydride by such prior art procedure, starting with an alkyl aromatic hydrocarbon, involves first partial oxidation to form carboxylic acid, and subsequently reaction of the latter to form the anhydride.

An example of such prior art procedure is found in United States Patent No. 2,764,611, which issued September 25, 1956, to Ewald Katschmann. In this patent, the liquid phase partial oxidation of alkyl aromatics, e.g. alkyl benzenes or alkyl naphthalenes, to obtain alkyl aromatic monocarboxylic acids, and the reaction of the latter under conventional conditions to produce an anhydride of the aromatic acid, are disclosed. The patent further discloses liquid phase partial oxidation of the aromatic acid anhydride to obtain aromatic dicarboxylic acid. Presumably, a catalyst, e.g. phosphoric acid, is employed in the formation of the aromatic acid anhydride.

In contrast to this prior art procedure, the present invention provides a novel and simplified manner of obtaining aromatic acid anhydride, beginning with alkyl aromatic hydrocarbon. In a single process stage, the hydrocarbon is converted to carboxylic acid, and the latter is converted in situ to an anhydride. No special catalyst for the conversion of aromatic acid to anhydride is required.

The process of the invention involves contacting an alkyl naphthalene, dissolved in an alkanoic acid anhydride, with oxygen in the presence of a heavy metal oxidation catalyst. The reaction product contains the corresponding naphthalene carboxylic acid anhydride, and usually is essentially free of naphthalene carboxylic acid. The further oxidation of alkyl aromatic monoacid anhydride to aromatic diacid that is obtained in the process of the patent above, apparently does not occur to a substantial extent in the present process wherein oxidation and aromatic acid anhydride formation are carried out in a single stage.

The anhydrides produced according to the invention are useful in known acylation reactions to obtain aromatic acid derivatives for employment as plasticizers for vinyl resins and in other known applications of such derivatives. The acylation reactions can be carried out either before or after separation of the aromatic anhydride from other constituents of the oxidation product mixture.

The solvent in the process of the invention is an anhydride of an alkanoic acid, which acid has 2 to 4 carbon carbon atoms, e.g. acetic anhydride, propionic anhydride, n-butyric anhydride, isobutyric anhydride. Small amounts of the corresponding alkanoic acid may be present, but preferably the amount is less than 10 weight percent, more preferably less than 5 weight percent of the total solvent. Often, the oxidation is carried out at a temperature above the boiling point of the corresponding alkanoic acid, so that the latter, as formed in the reactions occurring during oxidation, is vaporized. Thus, for example, in an oxidation conducted at the boiling point of acetic anhydride, acetic acid vaporizes as it is formed. It may be desirable to add anhydride to the oxidation mixture to replace that which vaporizes.

The amount of solvent employed is sufficient to dissolve the alkyl aromatic charge stock. Frequently the amount is in the range from 5 to 20 parts by weight of anhydride per part of alkyl aromatic compound, but other proportions can be employed. In the process of the invention, a part of the anhydride used as solvent is believed to react with carboxylic acid as the latter is formed in the oxidation, and to form an anhydride of that carboxylic acid.

The temperature used in the present process is preferably in the range from 100 to 150° C. Lower temperatures give inferior results. Higher temperatures may produce satisfactory results, but may be undesirable from the standpoint of added expense. Satisfactory results are obtained at atmospheric pressure, but greater pressure, e.g. up to 200 p.s.i.g. or higher, may provide greater rate of oxidation to carboxylic acid.

A heavy metal oxidation catalyst is employed in the process of the invention. Preferred catalysts are cobalt salts of fatty acids, e.g. acetic, propionic, butyric, etc. Salts of higher fatty acids or of other carboxylic acids are satisfactory, provided that the salts are soluble in the anhydride reaction medium. A person skilled in the art can readily select soluble compounds. Salts and other compounds of other heavy metals such as manganese, known for use as catalysts in liquid phase partial oxidation of alkyl aromatic compounds, can be employed, but cobalt salt catalysts give generally superior results.

The amount of catalyst is preferably in the range from 5 to 100 weight percent, more preferably 15 to 30 weight percent, calculated as cobaltous acetate tetrahydrate, based on alkyl aromatic charge stock, though other amounts can be used in some cases.

It is not necessary to employ any catalyst other than the oxidation catalyst referred to previously, since satisfactory formation of anhydride occurs without any additional catalyst. However, additional catalytic material that does not interfere with the oxidation can be employed if desired. Catalyst activators and initiators, as known in the art, can also be employed if desired, though their use is not essential.

Suitable charge stocks for the process according to the invention include monoalkylnaphthalene, dialkylnaphthalene, and trialkylnaphthalene wherein said alkyl group contains from 1 to 3 carbon atoms. Illustrative examples of satisfactory charge stocks include 1-methyl naphthalene, 2-methyl-naphthalene, 1-n-propyl naphthalene, 2,6 - dimethyl naphthalene, 1,7 - dimethyl naphthalene, 2,3,6-trimethyl naphthalene, etc. Generally those alkyl naphthalenes which are known to be oxidizable in liquid phase to naphthalene carboxylic acids are suitable. Mixtures of alkyl naphthalenes as obtained in processing of petroleum, coal tar, etc., can be employed to advantage.

The following examples illustrate the invention:

The following reaction mixture is prepared—

| | |
|---|---|
| 2,6-dimethyl naphthalene | grams 5 |
| Acetic anhydride | ml 50 |
| Cobaltous acetate tetrahydrate | grams 2.5 |

Substantially pure oxygen is passed through the liquid reaction mixture at 140° C., at a rate of 60 cc. of oxygen at standard conditions per minute for 12 hours. The following is the composition of the oxidation product—

| | Percent |
|---|---|
| 2,6-dimethyl naphthalene | 50–60 |
| Anhydride of 6-methyl-2-naphthoic acid | 30–40 |
| 6-methyl-2-naphthaldehyde | 10 |

The constituents of the reaction product are separated by distillation or fractional crystallization or other means. Alternatively, the anhydride in the product is reacted in situ with an alcohol or amine etc. to form an ester or amide etc., and the latter is separated by distillation or fractional crystallization or other means from the other constituents of the product. Such reactions of the anhydride are conducted under conventional procedures for formation of esters, amides, etc.

Generally similar results are obtained using other anhydrides, catalysts, charge stocks and reaction conditions as disclosed previously.

The invention claimed is:

1. A one-step process for preparation of naphthalene carboxylic acid anhydrides which comprises: contacting an alkyl naphthalene wherein said alkyl group contains from 1 to 3 carbon atoms, dissolved in an anhydride of an alkanoic acid having from 2 to 4 carbon atoms, with oxygen in the presence of a heavy metal oxidation catalyst, thereby to convert the alkyl naphthalene to the corresponding naphthalene carboxylic acid anhydride.

2. Process according to claim 1 wherein the temperature of contacting is in the range from 100 to 150° C.

3. Process according to claim 1 wherein the alkyl naphthalene is 2,6-dimethyl naphthalene, and the anhydride is 6-methyl-2-naphthoic acid anhydride.

4. A one-step process for preparing anhydrides of alkylnaphthalene carboxylic acids which consists essentially of: contacting an alkylnaphthalene selected from the group consisting of monoalkylnaphthalene, dialkylnaphthalene, and trialkylnaphthalene wherein said alkyl group contains from 1 to 3 carbon atoms, dissolved in an anhydride of an alkanoic acid having from 2 to 4 carbon atoms, with oxygen in the presence of a heavy metal oxidation catalyst, thereby to convert in situ the alkylnaphthalene to the corresponding naphthalene carboxylic acid anhydride.

5. Process according to claim 4 wherein the temperature of contacting is in the range from 100° C. to 150° C.

6. Process according to claim 4 wherein the alkylnaphthalene is 2,6-dimethylnaphthalene, and the naphthalene carboxylic acid anhydride is 6-methyl-2-naphthoic acid anhydride.

7. Process according to claim 4 wherein said alkanoic acid anhydride is acetic anhydride.

8. Process according to claim 4 wherein said heavy metal oxidation catalyst is cobaltous acetate tetrahydrate.

9. Process according to claim 4 wherein said alkylnaphthalene is dissolved in from 5 to 20 parts by weight of alkanoic acid anhydride per part alkylnaphthalene.

References Cited in the file of this patent

UNITED STATES PATENTS

| | | |
|---|---|---|
| 2,727,919 | Saunders | Dec. 20, 1955 |
| 2,764,611 | Katzschmann | Sept. 25, 1956 |